United States Patent Office 3,471,511
Patented Oct. 7, 1969

3,471,511
PREPARATION OF 2-(FLUOROPHENYL)-4(5)-NITROIMIDAZOLES
Janos Kollonitsch, Westfield, N.J., assignor to Merck & Co., Inc., Rahway, N.J., a corporation of New Jersey
No Drawing. Filed Sept. 12, 1966, Ser. No. 578,473
Int. Cl. C07d 49/36
U.S. Cl. 260—309                                         3 Claims

ABSTRACT OF THE DISCLOSURE 2-(fluorophenyl)-4(5)-nitroimidazoles prepared by reaction of 2-(aminophenyl)-4(5)-nitroimidazoles with sodium nitrite in liquid hydrogen fluoride at elevated temperature and pressure.

---

This invention relates to processes for converting amino groups to fluoro groups. More particularly, it is concerned with a method of converting aminophenyl compounds to the corresponding fluorophenyl compounds. Specifically, it is concerned with a method for converting a 2-(aminophenyl)-4(5)-nitroimidazole to the corresponding 2-(fluorophenyl)-4(5)-nitroimidazole. The compounds are useful in the treatment of protozoal diseases.

The 2-fluorophenyl-5-nitroimidazoles having an alkyl or hydroxyalkyl substituent in the 1-position have antiparasitic activity and are particularly useful in the treatment of protozoan-caused diseases. Thus, they are effective in the treatment of a poultry disease known as histomoniasis, which is due to a protozoan parasite *Histomonas meleagridis*. This disease, also known as turkey blackhead or enterohepatitis, is a serious economic problem in the turkey raising industry. In addition, the nitroimidazole compounds are active against *T. vaginalis* and are therefore useful in the treatment of vaginal infections due to this protozoan parasite.

One process for the preparation of these 2-fluorophenyl)-5-nitroimidazoles involves halogenating the corresponding 2-aminophenyl compound. The 2-fluorophenyl compound can then be reacted to introduce the 1-alkyl or 1-hydroxyalkyl substituent to produce the desired 1-substituted-2-halophenyl-5-nitroimidazole.

Processes for converting aminophenyl compounds to the corresponding fluorophenyl compounds are known to the art. Thus it might be expected that a variation of the Sandmeyer reaction described in the literature (see Houben-Weyl, Methoden der Organischen Chemie, fourth ed. vol. 5/3, p. 213) would serve for this conversion. This prior art process involves dissolving the aromatic amine in liquid hydrogen fluoride, adding NaNO₂, then aging the solution at room temperature for about one day. The aromatic fluoride thus formed may then be isolated and recovered. However, this process is not of general applicability. Many aromatic amines can not be converted to the corresponding fluorides by this technique [see J. Chem. Soc. vol. 72, p. 4809 (1950)]. In particular this process is inapplicable to conversion of 2-(aminophenyl)-4(5)-nitroimidazole to the corresponding 2-(fluorophenyl)-4(5)-nitroimidazole. When the 2-(aminophenyl)-4(5)-nitroimidazole is dissolved in liquid hydrogen fluoride and sodium nitrate added, allowing the reaction mixture to stand at room temperature for up to three days fails to produce the desired fluorophenyl product. Careful efforts to isolate the desired reaction product from the so aged reaction mixture has resulted only in recovery of some brick-red crystals; they turned out to be a diazonium salt. Therefore, other methods have been sought to effect the desired conversion.

It is an object of this invention to provide an improved process for converting aminophenyl compounds to fluorophenyl compounds.

Another object of this invention is to provide an improved method for converting 2-(aminophenyl)-4(5)-nitroimidazole to 2-(fluorophenyl)-4(5)-nitroimidazole in good yields.

Other objects will be apparent from the detailed description of this invention hereinafter provided.

In accordance with this invention it has not been found that conversion of aromatic amines to the corresponding fluorophenyl compounds can be effected by reaction with NaNO₂ in liquid hydrogen fluoride provided elevated temperatures and pressures are employed, i.e. equilibrium pressure and a reaction temperature in excess of 50° C. Thus the conversion is effected by autoclaving the reaction mixture at a temperature in the range of 50°–150° C. Specifically then the method of this invention can be employed to convert 2-(aminophenyl)-4(5)-nitroimidazole to 2-(fluorophenyl)-4(5)-nitroimidazole. In carrying out the conversion in accordance with the present procedure, the aminophenyl compound is first dissolved in an excess of liquid hydrogen fluoride (10–100 times the quantity required for the reaction itself) then the stoichiometric quantity of NaNO₂ is added while maintaining the mixture chilled. Thereafter the reaction mixture is sealed and heated to a reaction temperature above 50° C., under applied pressure or under internally generated pressure sufficient to maintain liquid phase conditions at the elevated reaction temperature. The elevated reaction temperature level is maintained until completion of the conversion reactions.

The desired fluorophenyl compound is then recovered from the resulting reaction mixture. Thus when 2-(aminophenyl)-4(5)-nitroimidazole is converted to 2-(fluorophenyl)-4(5)-nitroimidazole, the product is recovered from the reaction mixture by evaporating off the hydrogen fluoride then washing the residue with water and drying.

The following examples illustrates methods of carrying out the present process.

Twenty-three ml. of liquid hydrogen fluoride is placed in an 85 ml. Teflon lining supported by a flask. Thereafter 6.5 grams of 2-(p-aminophenyl)-4(5)-nitroimidazole (0.0319 mol) is dissolved therein and followed by addition of 2.2 grams of sodium nitrite (0.0319 mol) in stages over a 10-minute interval. The liquid HF is stirred during the NaNO₂ addition and the flask kept cool by an ice bath. The solution thus obtained is transferred (still inside the Teflon liner) to a stainless steel bomb, then heated to 100° C., and held at 100° C. for about sixteen hours. The vapor pressure of pure HF is about 100 p.s.i.a. at this reaction temperature level although the actual pressure inside the stainless steel bomb rises to a higher level due to the release of nitrogen (theoretically 0.0721 at standard conditions) during the reaction. After the heating period has ended the stainless steel bomb is cooled to room temperature, the hydrogen fluoride then evaporated off and 30 ml. of water added to the residue. The separated precipitate which is 2(p-fluorophenyl)-4(5)-nitroimidazole, is filtered, then washed with water and dried in vacuo to give 5.1 grams of product with a melting point of 219–222° C., the yield is approximately 77% of theoretical.

Following the same procedure using 2-(o-aminophenyl)-4(5)-nitroimidazole and 2-(m-aminophenyl)-4(5)-nitroimidazole, the corresponding 2-(o-fluorophenyl)-4(5)-nitroimidazole and 2-(m-fluorophenyl)-4(5)-nitroimidazole respectively are obtained.

What is claimed is:
1. The process for converting 2-(aminophenyl)-4(5)-nitroimidazole to the corresponding fluorophenyl com- pound which comprises dissolving the aminophenyl compound in an excess of liquid hydrogen fluoride, adding $NaNO_2$ thereto, then heating the mixture consisting of aminophenyl compound, liquid hydrogen fluoride and $NaNO_2$ to a liquid phase reaction temperature in excess of 50° C. in a sealed system under pressure sufficient to maintain the reaction in liquid phase, thereafter cooling the reaction mixture and recovering the fluorophenyl compound therefrom.

2. The process of claim 1 wherein the heating is effected under autoclaving superatmospheric pressure conditions to a reaction temperature level in the range of about 50–150° C.

3. The process of claim 1 wherein 2-(p-aminophenyl)-4(5)-nitrimidazole is thereby converted into 2-(p-fluorophenyl)-4(5)-nitroimidazole.

References Cited

UNITED STATES PATENTS 2,563,796 8/1951 Shenk et al.
2,861,984 11/1958 Gordon et al.

OTHER REFERENCES

Ferm et al. Jour. Amer. Chem. Soc. vol. 72, pp. 4809–10 (1950).

Houben-Weyl Methoden der Organischen Chemie vol. 5/3, pp. 213–17 Stuttgart, Georg Thieme, 1962.

HENRY R. JILES, Primary Examiner

NATALIE TROUSOF, Assistant Examiner

U.S. Cl. X.R.

260—141, 650, 999